United States Patent [19]

Jacoby et al.

[11] 3,945,124
[45] Mar. 23, 1976

[54] CONTACT SENSOR FOR WORKPIECE CALIPERING

[75] Inventors: Hans-Dieter Jacoby, Werdorf; Erich Schuster, Huttenberg, both of Germany

[73] Assignee: Ernst Leitz GmbH, Wetzlar, Germany

[22] Filed: Oct. 24, 1974

[21] Appl. No.: 517,643

[30] Foreign Application Priority Data
Nov. 9, 1973 Germany............................ 2356030

[52] U.S. Cl. ............ 33/169 R; 33/172 E; 33/174 L
[51] Int. Cl.² .... G01B 5/00; G01B 5/20; G01B 7/00
[58] Field of Search .......... 33/169 R, 172 R, 172 E, 33/174 R, 174 L, 174 PC, DIG. 6, DIG. 13

[56] References Cited
UNITED STATES PATENTS

| | | | |
|---|---|---|---|
| 2,065,951 | 12/1936 | Terry | 33/148 H |
| 3,845,561 | 11/1974 | Elsdoerfer | 33/169 R |
| 3,869,799 | 3/1975 | Neuer et al. | 33/169 R |

FOREIGN PATENTS OR APPLICATIONS

| | | | |
|---|---|---|---|
| 1,912,605 | 10/1970 | Germany | 33/172 R |
| 167,640 | 2/1965 | U.S.S.R. | 33/174 Q |

OTHER PUBLICATIONS

Gustafson, R. M., IBM Technical Disclosure Bulletin, Vol. 3, No. 11, April 1961, p. 43.

*Primary Examiner*—Richard E. Aegerter
*Assistant Examiner*—Richard R. Stearns
*Attorney, Agent, or Firm*—Gilbert L. Wells

[57] ABSTRACT

A sensor for calipering workpieces having one spring parallelogram for Apr. motion in each coordinate axis wherein additional spring means vary the spring constant in at least one of the spring parallelograms. The spring means include two coil springs acting in opposition to one another having between the opposed ends intermediate spring bolts, ball stops between the heads of the bolts and a bending rod with a ball at the end thereof acting on the heads of the bolts to compress the coil springs while being held without play by the ball stops.

7 Claims, 4 Drawing Figures

CONTACT SENSOR FOR WORKPIECE CALIPERING

CROSS REFERENCES TO RELATED APPLICATIONS

Applicants claim priority under 35 U.S.C. 119 for German Application No. 23 56 030, filed Nov. 9, 1973 in the Patent Office of the Federal Republic of Germany.

The disclosure of assignee's copending application Ser. No. 456,433, filed Mar. 29, 1974 now U.S. Pat. No. 3,905,119, which is a continuation of application Ser. No. 244,555, filed Apr. 19, 1972, and the references cited therein, namely U.S. Pat. Nos. 2,938,275; 3,167,867; 2,992,491; 3,160,959; 2,775,041; and 3,069,779, and British Pat. No. 894,714 are incorporated herein to show the state of the art of devices for testing the contour of objects.

BACKGROUND OF THE INVENTION

The present invention relates to a contact sensor for workpiece calipering having one spring parallelogram for each coordinate axis used for the measurement of translation.

Sensing heads for mechanical scanning of workpiece bodies in three-dimensional measuring instruments are known. Such sensors are either supported rotationally in two axes and translationally in the third, or translationally in all three. Translational execution is implemented by correspondingly arranged spring parallelograms.

Sensors also are known, wherein the measurement forces are applied by additional steps. In this manner the sensing position for read-out is the same in every case. Therefore, converting or correcting the measured data no longer is necessary.

Such sensors suffer from the drawback of relatively high costs required especially by multi-dimensional scanning to obtain the measurement forces.

In another design, the measurement force is not applied in special manner to the sensor. Rather, it is obtained from a sensor deflection of known magnitude, which then is combined by suitable measurement techniques with the value from the measurement detection system to provide the proper result. As regards a special case of such a design, a sensor deflection is less than the accuracy of the measuring instrument, so that this combination may be omitted.

The following problem is encountered with sensors of the last-mentioned kind; the deflection of the feeler point for the measurement under consideration should be as small as possible on technical grounds. This requires a relative steep slope of the force-distance relationship (stiff spring) for each degree of freedom of the feeler point in order to generate a given measuring force. On the other hand, a certain play in motion is required with respect to the sensor so that the sensing head may itself assume control of motion in the case of collisions between workpiece and sensor, and so it may immediately brake the motion in order to prevent destruction. However, a stiff spring and appreciable play in motion are contrary requirements.

SUMMARY OF THE INVENTION

The present invention has as an object the harmonizing of these requirements in a contact-sensor for workpiece calipering.

This object is achieved for a contact-sensor of the initially disclosed kind, which is further characterized by additional spring means for varying the spring or elasticity constant in at least one spring parallelogram.

The spring means may be in the form of helical or coil springs which in the rest position directly press against stops or otherwise by means of intermediate members, and acting in opposite directions, these spring means are controlled by at least one bending rod. The stops are suitably designed so that initially only the spring force of the bending rod significantly increases when there is a deflection of the spring parallelogram, and that for further deflection, the spring force of a helical spring becomes effective. As regards one embodiment, helical springs are mounted at one plate or a spring parallelogram, and the bending rod is mounted on an opposite plate. However, the sensor may also be characterized by helical springs mounted on one plate of a spring parallelogram and by a bending or deflecting rod mounted at least at one of the springs of the parallelogram. A piezo-electric rod may serve as a bending bar. Appropriately, the bending bar is characterized by a steep force distance slope and each of the coil springs by a flat one. A further embodiment of the caliper-sensor is characterized in that spheres rigidly connected to one of the parallelogram plates are used as stops for the coil springs, in that the bending rod acts on the coil springs by means of a ball or sphere movable with respect to the spring parallelogram and mounted only on the bending bar, and in that this bending rod ball is kept without play between spring bolts abutting the stops.

BRIEF DESCRIPTION OF THE DRAWINGS

The invention is described below by reference to the drawings which illustrate embodiments of the invention in diagrammatic form in the figures.

DESCRIPTION OF THE PREFERRED EMBODIMENTS

Figure 1:
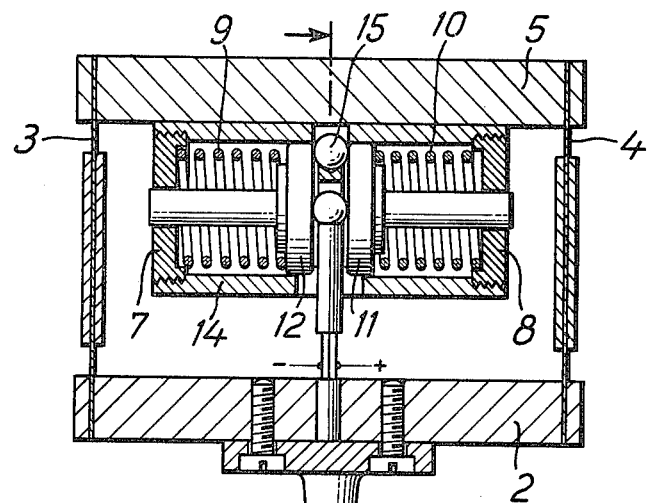
FIG. 1 is a front view in cross section of a sensing element.
Figure 2:
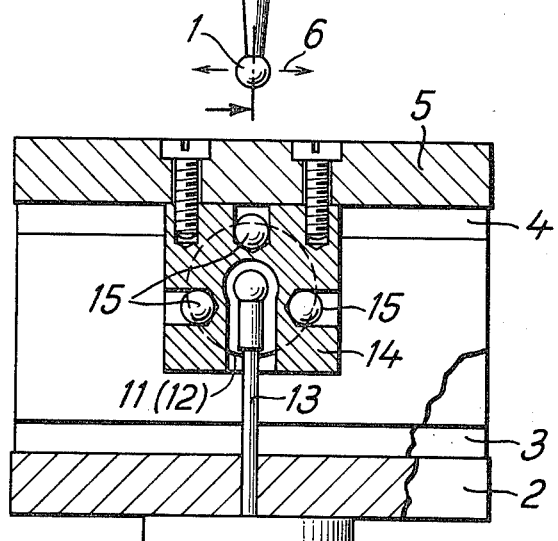
FIG. 2 is a side view in cross section of FIG. 1.

FIG. 1 shows a feeler point 1 rigidly connected with plate 2 of a parallelogram guide, this plate being movable in the direction of arrow 6. Plate 2 is connected to a base plate 5 by means of leaf springs 3,4. The base plate 5 is rigidly supported and held in place as regards the direction of arrow 6. Two spring pots 7, 8 are mounted on base plate 5, with helical or coil springs 9, 10 oriented axially parallel to arrow 6. Pre-stressed coil springs 9, 10 press stop bolts 11, 12 against three balls 15 acting as stops and mounted in a spring housing 14, as shown in FIG. 2. The end of a bending rod 13 fastened to part 2 projects through a hollow in spring housing 14 between and without play with respect to the stop bolts 11, 12.

The arrangement described so far operates as follows: if in a relative motion in the direction of arrow 6 the feeler point 1 touches a workpiece, bending rod 13 initially experiences bending characterized by a steep force-distance slope, as shown for minor sensor deflections in FIG. 3. If the measuring force generated thereby exceeds that of pre-stressed springs 9, 10, then the latter deform, whereby the measurement force only increases slightly on account of the flat slope of the force-distance relationship now becoming effective as illustrated in FIG. 3.

Figure 4:
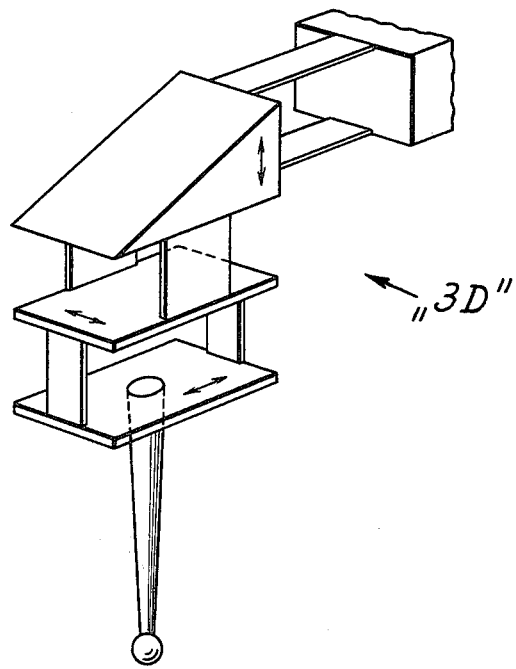
FIG. 4 shows a 3-D sensing head in diagramatic form.

FIG. 4 shows a possible combination of three sensing elements of FIGS. 1 and 2 so as to obtain a 3-D sensor. Spring elements 7 through 13 are omitted from the parallelogram guides for the sake of clarity. The described arrangement allows achieving motions for sensing of only a few microns for measuring forces up to about 50 pounds, a dead motion of the sensor of several mm being available simultaneously for larger loads.

The advantage of the sensor of the present invention with respect to the prior art consists in the feasibility of highly accurate measurement while eliminating the cost of motors otherwise required for control.

Figure 3:
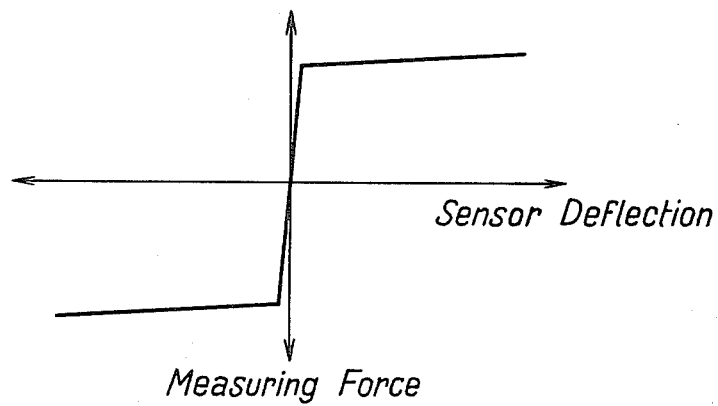
FIG. 3 is a force-distance diagram associated with FIGS. 1 and 2.

In a particular embodiment of the invention, a piezoelectric bending rod 13, as shown in FIG. 3, has a steep slope for sensor deflection versus measuring force, as shown in the middle of FIG. 3, and the coil springs 9, 10 have a relative flat slope for sensor deflection versus measuring force, as shown at the right and left of FIG. 3.

Another particular embodiment of the present invention contemplates a plurality of spheres 15 rigidly connected with one of the parallelogram plates 5 and provided as stops for the coil springs 9, 10. The bending rod 13 acts by means of a sphere or ball movable with respect to the coil spring parallelogram and fastened to the rod by coil springs 9, 10 where the spring bolts 11, 12 abutting the stops (spheres 15) keep the bending rod without play.

We claim:

1. In a sensor for calipering workpieces having at least two coordinate axes of measurement of translational motion and having one spring parallelogram for each of said coordinate axes, the improvement comprising at least one of said spring parallelograms having a given elasticity constant combined with additional spring means (9,10,13) for varying said elasticity constant of said one of said spring parallelograms as a function of the deflection of said sensor along the coordinate axis associated with said one spring parallelogram.

2. The sensor of claim 1, wherein said one of said spring parallelograms consists of a base plate (5) and an opposite plate (2) suspended therefrom by two leaf springs (3,4).

3. The sensor of claim 1, wherein coil springs (9,10) and at least one bending rod (13) define said additional spring means; said coil springs housed in opposed spring pots (7,8) defined by a housing (14) mounted on said base plate; said bending rod connected to said opposite plate and tensionally coupling said coil springs to said opposite plate.

4. The sensor of claim 3, wherein said coil springs each engage and inwardly bias intermediate member (11,12), and stop members (15) are placed in said housing between said intermediate members for determining the spacing therebetween, thus providing said coil springs with a given residual stress.

5. The sensor of claim 4, wherein said bending rod is a piezo-electric bending rod.

6. The sensor of claim 5, wherein said bending rod has a steep slope for a plot of sensor deflection versus measuring force and said coil springs have a relative flat slope for a plot of sensor deflection versus measuring force.

7. The sensor of claim 5, wherein said stop means are a plurality of spheres (15) having a given diameter connected to said base plate, said bending rod has a sphere with said given diameter at the end thereof between said intermediate members and said stop means to maintain said bending rod without play.

* * * * *